United States Patent [19]

Itschner

[11] 3,970,832

[45] July 20, 1976

[54] APPARATUS AND METHOD FOR OBTAINING AN ELECTRICAL SIGNAL CORRESPONDING TO THE SPECIFIC ENTHALPY OF STEAM

[75] Inventor: Bruno Itschner, Karlsruhe, Germany

[73] Assignee: Siemens Aktiengesellschaft, Munich, Germany

[22] Filed: Mar. 5, 1975

[21] Appl. No.: 555,541

Related U.S. Application Data

[63] Continuation of Ser. No. 469,621, May 13, 1974, which is a continuation of Ser. No. 286,922, Sept. 7, 1972.

[30] Foreign Application Priority Data

Sept. 16, 1971 Germany ........................ 2146240

[52] U.S. Cl. ........................ 235/151.3; 73/193 A; 235/184; 235/193

[51] Int. Cl.² .................... G06G 7/56; G01K 17/08

[58] Field of Search ................ 235/151.3, 193, 184; 73/15 R, 15 A, 15 B, 193, 192, 25, 204

[56] References Cited

UNITED STATES PATENTS

| | | | |
|---|---|---|---|
| 3,204,447 | 9/1965 | Krause et al. | 73/15 R |
| 3,436,534 | 4/1969 | Wallace | 235/151.3 X |
| 3,639,737 | 2/1972 | McKee | 235/151.3 |

*Primary Examiner*—Joseph F. Ruggiero
*Attorney, Agent, or Firm*—Kenyon & Kenyon Reilly Carr & Chapin

[57] ABSTRACT

Apparatus and method for obtaining an electrical signal corresponding to the enthalpy of steam expressed by Koch's state equation, is disclosed. In the form of Koch's state equation which is used, terms of minor significance are neglected and the equation is converted into a logarithmic form suitable for solution by electrical analog computer elements. A circuit arrangement comprised of adders, multipliers and function generators is disclosed for simulating and solving the potential and exponential functions in the formula for the enthalpy $$i = i_o(t) - A\cdot p(1/t^{2.82}) - e^{(\ln B + 3\ln p - 14\ln t)},$$

where $i_o$ is a basic quantity dependent only on the temperature $t$, the pressure, $p$, and A and B are constants.

9 Claims, 5 Drawing Figures

APPARATUS AND METHOD FOR OBTAINING AN ELECTRICAL SIGNAL CORRESPONDING TO THE SPECIFIC ENTHALPY OF STEAM

This is a continuation of application Ser. No. 469,621 filed May 13, 1974 which is a continuation of application Ser. No. 286,922 filed Sept. 7, 1972.

BACKGROUND OF THE INVENTION

1. Field of the Invention

This invention is concerned with a method for obtaining an electrical quantity corresponding to the specific enthalpy of steam, and a circuit arrangement for carrying out the method.

2. Description of the Prior Art

In thermal processes, a more accurate determination of the progress of the process can frequently be made from the enthalpy of the process than by only using the customary quantities of pressure and temperature. The three state quantities, pressure, temperature and enthalpy, have a large non-linear mutual relationship. Further because the enthalpy, *i*, is an unequivocal measure of the ratio of the heat input to the flow of the water through the system, the enthalpy, *i*, particularly in the control of boilers is highly suited as an auxiliary control quantity for the rapid sensing of heating disturbances. Up to now, however, the enthalpy, *i*, has not been used as a measurement or auxiliary control quantity, because its conversion into an electrical quantity having the required accuracy for control problems within an extended operating range and the permissible equipment expense, was considered as too difficult.

Empirically determined values of the enthalpy of water or steam as a function of temperature and pressure have been compiled in published tables (For example, the VDI Steam Tables) and are presented graphically in so-called $(i,t)$ diagrams (See FIG. 1).

Also the enthalpy of steam has been expressed in algebraic form as a function of pressure and temperature, in the so-called Koch state equation.

The problem therefore is to provide a method by which the enthalpy of steam can be reproduced electrically by simple means with accuracy sufficient for control purposes over a relatively large range.

The range of interest is defined approximately as follows:

$$50\ \text{kg/cm}^2 \leq p \leq 300\ \text{kg/cm}^2$$
$$250°\text{C} \leq t \leq 450°\text{C}$$
$$600\ \text{kcal/kg} \leq i \leq 750\ \text{kcal/kg}$$

This operating range is entered in the $(i,t)$ diagram in FIG. 1.

SUMMARY OF THE INVENTION

To solve this problem, a method of the type discussed above has been developed in which the powers of the state quantities, pressure and temperature, appearing in the individual terms of Koch's state equation for the enthalpy, $i = f(P,T)$, are simulated by function generators and are linked to each other in the manner required by Koch's state equation.

In order to reduce the calculating effort, the terms of negligible significance in Koch's state equation are ignored in certain pressure-temperature ranges of the simulation. It has further been found that Koch's state equation in the form $$i = i_0 - 3.82\ A \frac{P}{\left(\frac{T}{100°\text{K}}\right)^{2.82}} - p^3 \left[ \frac{5B}{\left(\frac{T}{100°\text{K}}\right)^{14}} + \frac{32.6 \cdot C}{3\left(\frac{T}{100°\text{K}}\right)^{31.6}} \right] \quad (1)$$

can be simulated particularly well without leading to less accurate results than more complex forms of representation. Further the last term $$\frac{32.6 \cdot C}{3(T/100\ K)^{31.6}}$$

can be ignored.

In the equation P represents the pressure in kg/m², T is the temperature in degrees Kelvin, A, B and C are constants having the appropriate dimensions and $i_o$ is a quantity dependent only on the temperature:

$$i_o = (0.495 \cdot t\rho\text{C} + 585.5)\ \text{kcal/kg} \quad (2)$$

As will be seen from the equation, high powers, particularly of temperature, must be processed.

In the exact simulation of Koch's state equation in the operating range, approximation errors of up to 16 kcal/kg occur from the table value, considered to be correct.

The electrical output quantity obtained by the method of the invention is therefore corrected by a correction circuit, which in a first step adjusts the function generator for the third power of the pressure in such a manner that for a definite temperature an exact output quantity occurs corresponding to the tabulated value of the VDI Steam Tables, and, in a second step, starting at a predetermined correction limit, a correction function $f(i,t)$, is computed for each curve of the family of curves in the $(i,t)$ diagram. The value of the correction factor is subtracted from the output quantity calculated by Koch's state equation to obtain a better approximation of the computed values to the empirically determined values set forth in the table. Within the operating range, the approximation errors can thus be reduced to less than 2 kcal/kg.

Koch's state equation, and the correction factors, set forth in the abbreviated form of equation 1 given above can be simulated either on a digital computer or by an analog computing circuit. In order to provide the broadest possible applicability with the least effort, the representation of Koch's state equation in analog form is chosen. Here, however, the quotient $P^3 \cdot (1/T^{14})$ cannot be realized with the required accuracy by conventional multiplier units for the values of P and T in the operating range.

Koch's state equation is there transformed into the following form, more favorable for analog simulation:

$$i = i_o(t) - A' \cdot p\,(l/t^{2.82}) - e^{(\ln B' + 3 \cdot \ln p - 14 \cdot \ln t)} \quad (3)$$

Here, $p$ and $t$ are dimensionless, normalized quantities of the pressure P and the temperature T, and A′ and B′ are constants. In the analog computing circuit, all quantities are represented as voltages and currents. The circuit arrangement for carrying out the method can be built relatively simple from analog building blocks, such as function generators, multipliers and amplifiers. The individual series of curves for the potential and exponential functions can be simulated without difficulty by the function generators, designed by known techniques as analog computers of the series of curves.

DESCRIPTION OF THE PREFERRED EMBODIMENT

Figure 1:
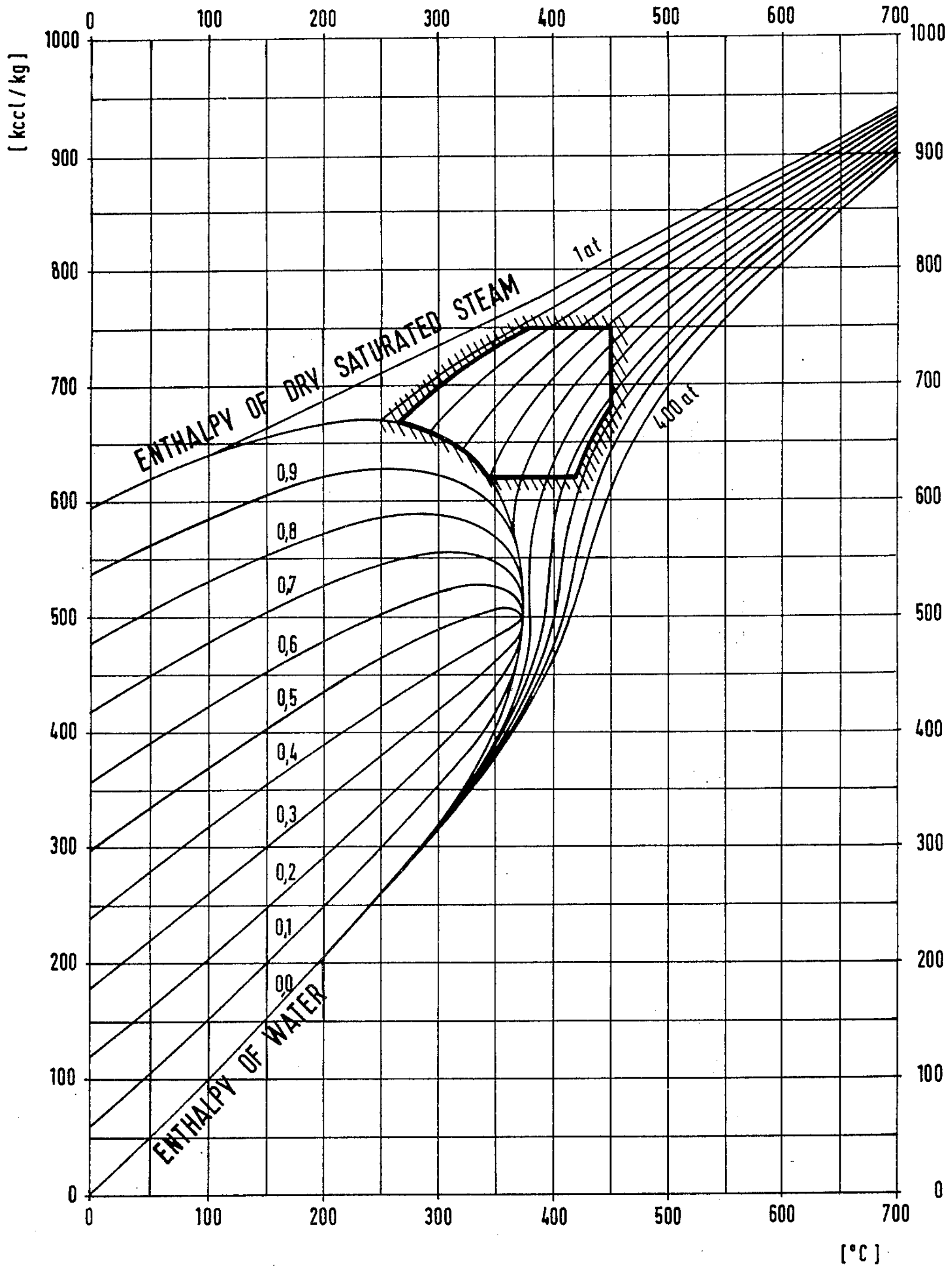
FIG. 1 is a graph of the enthalpy plotted against temperature.
Figure 2:
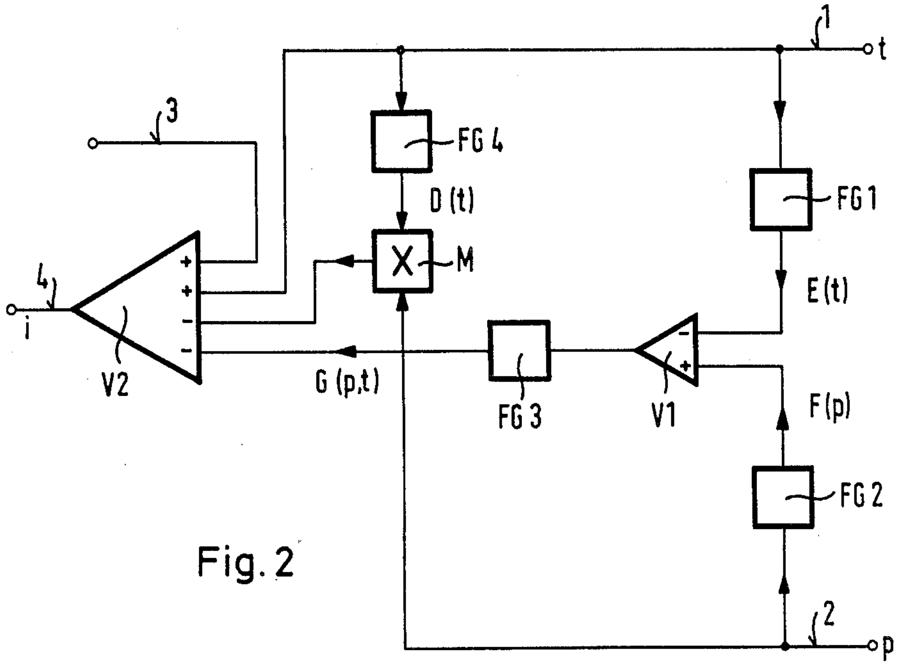
FIG. 2 is a block diagram showing an example of an embodiment in which an analog circuit arrangement computes the enthalpy $i$ from the pressure $p$ and the temperature $t$ in accordance with Koch's state equation.

In FIG. 2 the line 1 carries a voltage proportional to the temperature, $t$, and the line 2 a voltage proportional to the pressure $p$. Connected to line 1 is a first function generator FG1, having the signal of line 1 as its input. The output signal of FG1 represents the function $E(t) = 14 \cdot \ln t$. The input of a second function generator FG2 is connected to line 2 with its input the signal of line 2. Its output voltage represents the function $F(p) = \text{const} + 3 \ln p = \ln B' + 3 \ln p$. The two functions $E(t)$ and $F(p)$ are joined in the summing amplifier V1 as required by Eq. (3), where they appear as the third term. In the third function generator FG3 following the first summing amplifier V1, a function $G(p,t) = e^{[F(p) - E(t)]}$ is formed and fed to the first of the four inputs of a second summing amplifier V2. A fourth function generator FG4 has line 1, the voltage of which corresponds to the temperature $t$, connected as its input. In the function generator FG4, the function $D(t) = t^{-2.82}$ is formed and fed to a multiplier M.

Multiplier M forms the product of the function $D(t)$ and the pressure $p$ and feeds this product to the second input of the second summing amplifier V2. Furthermore, the quasi-linear component $i_o$ must be reproduced as the first term of Equation (3), and as already mentioned (See Eq. 2), $i_o(t)$ can be represented as the sum of constant + constant $\cdot\ t$. Accordingly, the temperature $t$, together with a constant factor, is fed to the third input of the second summing amplifier V2, and by line 3, a constant voltage is fed to the fourth input of amplifier V2. At the output, 4, of the second summing amplifier V2 an output quantity calculated according to Koch's state equation appears corresponding to the specific enthalpy $i$.

Figure 3:
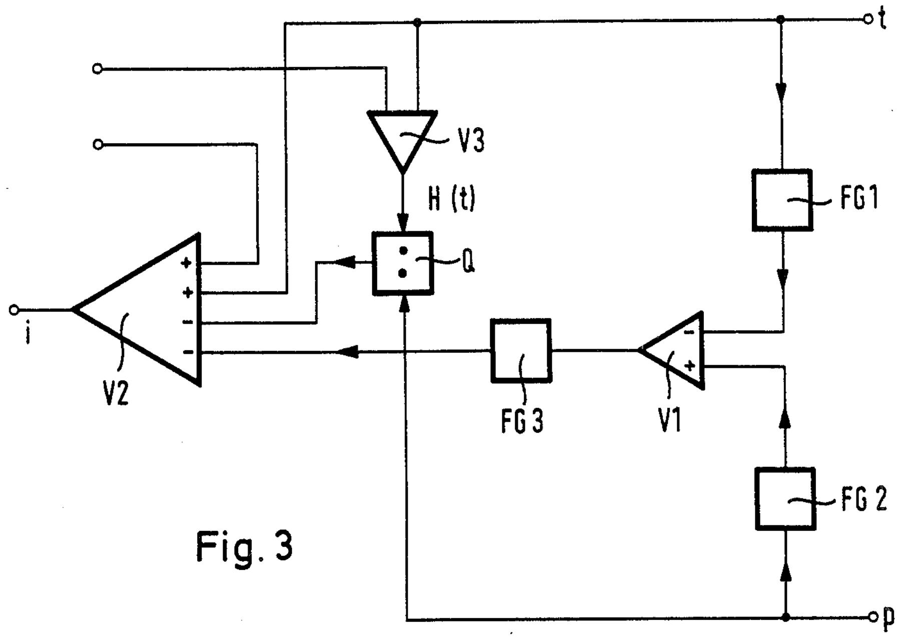
FIG. 3 is a simplified version of the circuit diagram of FIG. 2.

Another circuit arrangement, more simplified than the one shown in FIG. 2, is depicted in FIG. 3. The place of the fourth function generator, FG4, simulating the function, $D(t) = t^{-2.82}$, is replaced by a third summing amplifier, V3, having as one input the voltage from line 1, corresponding to the temperature $t$, and having a constant voltage as the other input. The inverse function, $1/D(t) = t^{2.82}$, can therefore be approximated in the range of interest by a straight line in the form of: const + const $\cdot\ t$. In order to obtain the quotient $p/t^{2.82}$ required for computing Koch's state equation, the output of the summing amplifier V3 is connected with the divider Q, to whose counting input the quantity $p$ is connected.

The remaining elements, and reference symbols, of the circuit correspond to that shown in FIG. 2.

The generation of the constants, A', B', which also appear in Eq. (3), as well as the other constants which result from normalizing this equation and are linked multiplicatively with the individual quantities, are not specifically shown in the circuit arrangements according to FIG. 2 and FIG. 3 inasmuch as they are not necessary for an understanding of the computation circuit.

Figure 4:
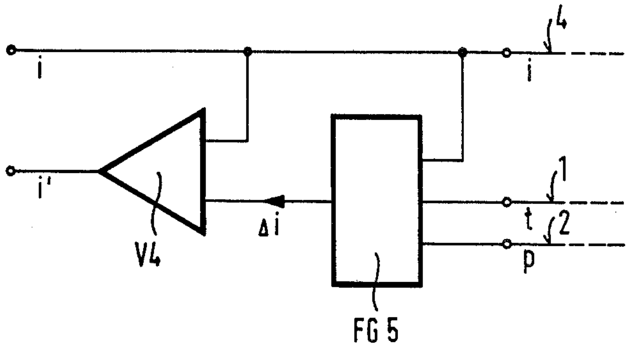
FIG. 4 is a circuit diagram for correcting the error in calculating the enthalpy caused by approximating a portion of Koch's state equation.

As previously explained, because the values calculated by means of Koch's state equation may have deviations up to 16 kcal/kg from the table values, a method is provided to correct the enthalpy value $i$, obtained by means of the computation circuits according to FIG. 2 or FIG. 3, and to reduce the error caused by approximating. As shown in FIG. 4 a correction circuit is used for this purpose, having as input quantities the value of the calculated enthalpy $i$ represented by the voltage on line 4, the temperature value $t$ represented by the voltage on line 1 and the pressure value $p$ appearing on line 2. The three quantities mentioned are transformed in another function generator FG5 into a function $\Delta i = f(i,t,p)$. The value $\Delta i$ is added in the summing amplifier V4 to the enthalpy value $i$ corresponding to Koch's state equation. The output quantity of the amplifier V4 thus corresponds to a corrected enthalpy quantity $i'$, the approximation error of which is below 2 kcal/kg.

Here also, it is possible to simplify the function generator FG5 by only feeding the input quantities $i$ and $t$. The necessary correction by the variable $p$ can be previously performed in the function generator, FG2.

Figure 5:
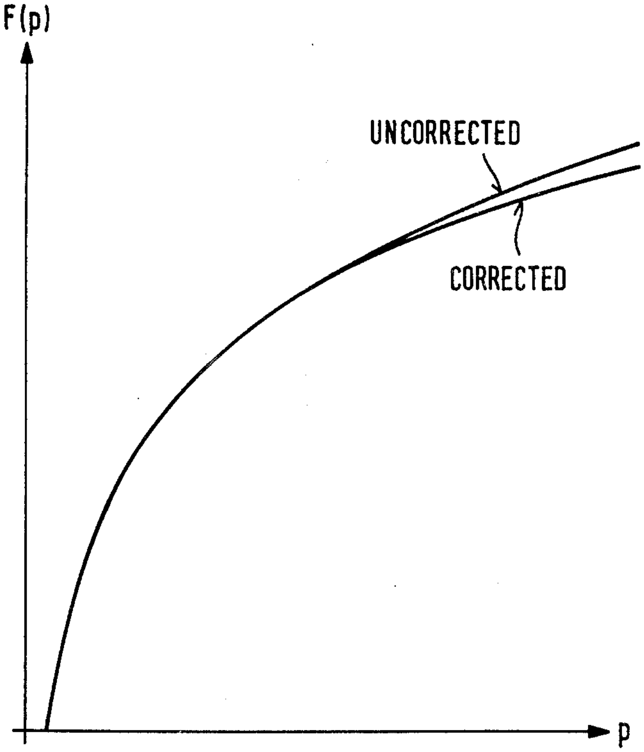
FIG. 5 is a graphical representation of the curves for the corrected and uncorrected values of the enthalpy.

FIG. 5 shows, the shape of the function $F(t) = \ln B' + 3 \ln p$ which is to be simulated by the function generator FG2. The deviation appearing at the higher pressures can be corrected by an appropriate adjustment of the function generator FG2. In FIG. 5, the upper end of the function curve is shown, first, for an uncorrected function, and again, for a corrected function. Thus, once the first step of the necessary correction is taken, a second step can be performed by a coordinate rotation of the simulated family of curves $i$ in the region below a given correction limit, so that the difference between the calculated and the table value exceeds a predetermined value.

For the realization of a coordinate rotation by electrical circuitry, several known possibilities exist, which, however, will not be discussed here.

The circuit arrangements shown can be built from analog building blocks relatively simply and can be adjusted independently of the system.

In the foregoing, the invention has been described in reference to specific exemplary embodiments. It will be evident, however, that variations and modifications, as well as the substitution of equivalent constructions and arrangements for those shown for illustration, may be made without departing from broader scope and spirit of the invention as set forth in the appended claims. The specification and drawings are accordingly to be regarded in an illustrative rather than in a restrictive sense.

What is claimed is:

1. Apparatus for determining the specific enthalpy of steam according to Koch's state equation comprising a first means responsive to the temperature of the steam for producing a variable output signal $E(t)$ which is a function of the natural logarithm of the temperature;

a second means responsive to the pressure of the steam for producing a variable output signal $F(p)$ which is a function of the sum of a constant and the natural logarithm of the pressure;

a third means connected to the output of the two means for algebraically adding the variable outputs of said means to form a combined output signal;

means connected to the combining means responsive to the combined signals for producing a variable output signal $G(p,t)$ which is a function of $c^{[F(p) - E(t)]}$;

means responsive to the temperature of the steam for producing a variable output signal $D(t)$ which is a function of the temperature raised to the −2.82 power;

means connected to the output of the temperature responsive means and a signal proportional to the pressure, said means responsive to both signals for producing a variable output signal which is a function of the product of the steam pressure and the function $D(t)$; and a summing means having four inputs, the variable output signal $G(p,t)$ as a first input, the product of the pressure and $D(t)$ as a second input, the variable signal which is a function of the temperature of the steam as a third input and a signal which is proportional to a predetermined constant as a fourth input, said summing means producing a variable output signal in response to said inputs which is a function of the specific enthalpy of the steam in accordance with Koch's state equation.

2. Apparatus for determining the specific enthalpy of steam as in claim 1, wherein the signal is an electrical signal, the means for producing variable output signals $E(t)$, $F(p)$, $G(p,t)$ and $D(t)$ comprise function generators, the means for algebraically adding the outputs of the function generators for $E(t)$ and $F(p)$ comprises a summing amplifier having an algebraically different sign between the two input signals thereto, the means for producing the product of $D(t)$ and a signal proportional to the pressure is a multiplier and the means for summing the four input signals comprises a summing amplifier in which the input signals $G(p,t)$ and $p \cdot D(t)$ negatively added, and the predetermined constant and the signal proportional to the temperature of the steam are positively added.

3. Apparatus for determining the specific enthalpy of steam as in claim 2 in which the output signal $F(p)$ is equal to the sum of a constant plus the product of a constant and the natural logarithm of the pressure, the output signal $E(t)$ is equal to the product of a constant and the natural logarithm of the temperature, the output signal $G(p,t)$ is equal to the exponential $e$ raised to the power $F(p) - E(t)$, the output signal $D(t)$ is equal to $t$ raised to the −2.82 power and the output signal from the summing amplifier having four inputs is the solution to the equation $$i = i_o(t) - A' \cdot p(1/t^{2.82}) - e^{(\ln B' + 3 \cdot \ln p - 14 \cdot \ln t)}$$

4. Apparatus for determining the specific enthalpy of steam according to Koch's state equation comprising a first means responsive to the temperature of the steam for producing a variable output signal $E(t)$ which is a function of the natural logarithm of the temperature, a second means responsive to the pressure of the steam for producing a variable output signal $F(p)$ which is a function of the sum of a constant and the natural loarithm of the pressure, a third means connected to the output of the two means for algebraically adding the variable outputs of said means to form a combined output signal, means connected to the combining means responsive to the combined signals for producing a variable output signal $G(p,t)$ which is a function of $c^{[F(p) - E(t)]}$, means, responsive to the temperature of the steam, for adding a signal proportional to the temperature of the steam and a predetermined constant, to produce a variable output signal representing the sum of the two functions, dividing means having the output of said summing means as a first input and a signal proportional to the pressure of the steam as a second input, said dividing means producing a variable output signal which is a function of the pressure divided by the sum of the predetermined constant and the temperature, a summing means having four inputs, the variable output signal $G(p,t)$ as the first input, the output of the dividing means as the second input, the variable signal which is a function of the temperature as the third input and a signal which is proportional to a predetermined constant as the fourth input, said summing means producing a variable output signal in response to said inputs which is a function of the specific enthalpy of the steam in accordance with Koch's state equation.

5. Apparatus for determining the specific enthalpy of steam as in claim 4 further comprising a correction circuit comprising a function generator having three input signals, the first signal being the output of the four input summing means, the second input being the signal proportional to the temperature of the steam, and the third signal being a signal proportional to the pressure of the steam, the output of said function generator representing a correction factor for the specific enthalpy of steam, and a summing amplifier having as an input the output of the four input summing means, and the output of the function generator, said summing amplifier producing an output signal proportional to the corrected value of the specific enthalpy of the steam.

6. Apparatus for determining the specific enthalpy of steam as in claim 2 further comprising a correction circuit comprising a function generator having three input signals, the first signal being the output of the four input summing means, the second input being the signal proportional to the temperature of the steam, and the third signal being a signal proportional to the pressure of the steam, the output of said function generator representing a correction factor for the specific enthalpy of steam, and a summing amplifier having as an input the output of the four input summing means, and the output of the function generator, said summing amplifier producing an output signal proportional to the corrected value of the specific enthalpy of the steam.

7. A method for determining the specific enthalpy of steam according to Koch's state equation comprising the steps of producing an electrical signal E($t$) in response to the temperature of the steam, said signal being a function of the product of a predetermined constant and the natural logarithm of temperature, producing an electrical signal F($p$) in response to the pressure of the steam, said signal being a function of the sum of the natural logarithm of a predetermined constant and the product of a constant and a natural logarithm of the pressure of the steam, algebraically adding the two electrical signals to produce a sum in which the signal which is a function of the predetermined constant and the natural logarithm of the temperature is subtracted from the signal, producing an electrical signal G($p,t$) in response to the algebraically added signals, said signal G($p,t$) being a function of the base $e$ raised to the F($p$) − E($t$) power, producing an electrical signal, D($t$), in response to the temperature of the steam, said signal D9$t$) being a function of the temperature raised to the −2.82 power, multiplying the electrical signal D($t$) by a signal proportional to the pressure of the steam to produce an electrical signal proportional to $p \cdot t^{-2.82}$ power, adding the electrical signals G($p,t$), the product $p \cdot t^{-2.82}$, a predetermined constant and a signal proportional to the temperature of the steam, both the signals G($p,t$) and the product $p \cdot t^{-2.82}$ being added negatively to the predetermined constant and the signal proportional to the temperature, the signal produced by said addition representing the specific enthalpy of the steam in accordance with Koch's equation, and wherein all of the foregoing steps are carried out in analog computing apparatus.

8. A method for determining the specific enthalpy of steam according to Koch's state equation comprising the steps of producing an electrical signal E($t$) in response to the temperature of the steam, said signal being a function of the product of a predetermined constant and the natural logarithm of the temperature, producing an electrical signal F($p$) in response to the pressure of the steam, said signal being a function of the sum of the natural logarithm of a predetermined constant and the product of a constant and the natural logarithm of the pressure of the steam, algebraically adding the two electrical signals to produce a sum in which the signal which is a function of the predetermined constant and the natural logarithm of the temperature is subtracted from the other signal, producing an electrical signal G($p,t$) in response to the algebraically added signals, said signal G($p,t$) being a function of the base $e$ raised to the F($p$) − E($t$) power, producing an electrical signal H($t$) representing the sum of a first predetermined constant and the product of a second predetermined constant and a signal proportional to the temperature of the steam.

dividing a signal proportional to the pressure of the steam by the signal H($t$) to form a variable output signal proportional to $p \cdot t^{-2.82}$, adding the electrical signals G($p,t$), the product $p \cdot t^{-2.82}$, a predetermined constant and a signal proportional to the temperature of the steam, both the signals G($p,t$) and the product $p \cdot t^{-2.82}$ being added negatively to the predetermined constant and the signal proportional to the temperature, the signal produced by said addition representing the specific enthalpy of the steam in accordance with Koch's equation, and wherein all of the foregoing steps are carried out in analog computing apparatus.

9. The method for determining the specific enthalpy of steam as in claim 7 further comprising the step of correcting the output signal formed by adding the four signals together, the correction step comprising forming a correction factor in a function generator from the output of the adding step, a signal proportional to the temperature of the steam and a signal proportional to the pressure of the steam, and adding a correction factor to the signal formed by adding the four signals together, to form a corrected output signal proportional to the corrected value of the specific enthalpy of the steam.

* * * * *

UNITED STATES PATENT AND TRADEMARK OFFICE

CERTIFICATE OF CORRECTION

PATENT NO. : 3,970,832

DATED : July 20, 1976

INVENTOR(S) : Bruno Itschner

It is certified that error appears in the above-identified patent and that said Letters Patent are hereby corrected as shown below:

In the Abstract, line 12: change "$i=j_o(t)$" to --$i=i_o(t)$--;

In Col. 2, line 25: change "tpC" to --$t/\mathring{C}$--;

In Col. 6, line 10: change "loarithm" to --logarithm--;

In Col. 6, line 16: change "$c^{[F(p)-}$" to --$e^{[F(p)-}$ --;

Signed and Sealed this

First Day of March 1977

[SEAL]

Attest:

RUTH C. MASON
*Attesting Officer*

C. MARSHALL DANN
*Commissioner of Patents and Trademarks*